United States Patent
Zhang et al.

(10) Patent No.: US 10,779,297 B2
(45) Date of Patent: Sep. 15, 2020

(54) USER EQUIPMENT AND METHODS OF BEARER OPERATION FOR CARRIER AGGREGATION

(71) Applicant: Intel IP Corporation, Santa Clara, CA (US)

(72) Inventors: Yujian Zhang, Beijing (CN); Youn Hyoung Heo, Seoul (KR)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/406,791

(22) Filed: May 8, 2019

(65) Prior Publication Data

US 2019/0364575 A1  Nov. 28, 2019

Related U.S. Application Data

(63) Continuation of application No. 15/994,154, filed on May 31, 2018, now Pat. No. 10,512,095, which is a
(Continued)

(51) Int. Cl.
*H04W 72/10* (2009.01)
*H04W 36/00* (2009.01)
(Continued)

(52) U.S. Cl.
CPC .......... *H04W 72/10* (2013.01); *H04B 17/318* (2015.01); *H04J 3/1694* (2013.01);
(Continued)

(58) Field of Classification Search
None
See application file for complete search history.

(56) References Cited

U.S. PATENT DOCUMENTS 8,483,061 B2 * 7/2013 Lerzer ............... H04W 12/0017
370/235
9,118,452 B2 * 8/2015 Park ...................... H04L 5/0091
(Continued)

FOREIGN PATENT DOCUMENTS

EP  3063982 A1  9/2016
EP  3063982 B1  8/2018
(Continued)

OTHER PUBLICATIONS

"U.S. Appl. No. 14/917,154, Corrected Notice of Allowance dated Mar. 22, 2018", 2 pgs.
(Continued)

*Primary Examiner* — Hong S Cho
(74) *Attorney, Agent, or Firm* — Kowert, Hood, Munyon, Rankin & Goetzel, P.C.

(57) ABSTRACT

Embodiments of a User Equipment (UE) to support dual-connectivity with a Master Evolved Node-B (MeNB) and a Secondary eNB (SeNB) are disclosed herein. The UE may receive downlink traffic packets from the MeNB and from the SeNB as part of a split data radio bearer (DRB). At least a portion of control functionality for the split DRB may be performed at each of the MeNB and the SeNB. The UE may receive an uplink eNB indicator for an uplink eNB to which the UE is to transmit uplink traffic packets as part of the split DRB. Based at least partly on the uplink eNB indicator, the UE may transmit uplink traffic packets to the uplink eNB as part of the split DRB. The uplink eNB may be selected from a group that includes the MeNB and the SeNB.

20 Claims, 6 Drawing Sheets

Related U.S. Application Data continuation of application No. 14/917,154, filed as application No. PCT/US2014/063080 on Oct. 30, 2014, now Pat. No. 10,015,805.

(60) Provisional application No. 61/898,425, filed on Oct. 31, 2013.

(51) Int. Cl.

| | | |
|---|---|---|
| *H04W 76/10* | (2018.01) | |
| *H04W 76/18* | (2018.01) | |
| *H04W 76/19* | (2018.01) | |
| *H04W 76/15* | (2018.01) | |
| *H04W 28/08* | (2009.01) | |
| *H04W 4/90* | (2018.01) | |
| *H04W 24/10* | (2009.01) | |
| *H04W 48/06* | (2009.01) | |
| *H04W 74/00* | (2009.01) | |
| *H04W 72/04* | (2009.01) | |
| *H04W 48/08* | (2009.01) | |
| *H04W 48/18* | (2009.01) | |
| *H04W 28/02* | (2009.01) | |
| *H04W 48/12* | (2009.01) | |
| *H04W 8/00* | (2009.01) | |
| *H04W 52/34* | (2009.01) | |
| *H04W 56/00* | (2009.01) | |
| *H04B 17/318* | (2015.01) | |
| *H04W 74/08* | (2009.01) | |
| *H04W 72/08* | (2009.01) | |
| *H04W 8/06* | (2009.01) | |
| *H04W 8/18* | (2009.01) | |
| *H04W 60/00* | (2009.01) | |
| *H04W 60/02* | (2009.01) | |
| *H04J 3/16* | (2006.01) | |
| *H04L 5/00* | (2006.01) | |
| *H04W 4/02* | (2018.01) | |
| *H04W 4/60* | (2018.01) | |
| *H04W 76/14* | (2018.01) | |
| *H04W 4/80* | (2018.01) | |
| *H04W 92/20* | (2009.01) | |
| *H04W 84/12* | (2009.01) | |
| *H04W 88/08* | (2009.01) | |
| *H04W 88/02* | (2009.01) | |
| *H04W 88/16* | (2009.01) | |
| *H04B 7/0413* | (2017.01) | |
| *H04W 8/04* | (2009.01) | |
| *H04W 88/18* | (2009.01) | |

(52) U.S. Cl.
CPC ............ *H04L 5/0007* (2013.01); *H04W 4/02* (2013.01); *H04W 4/023* (2013.01); *H04W 4/60* (2018.02); *H04W 4/80* (2018.02); *H04W 4/90* (2018.02); *H04W 8/005* (2013.01); *H04W 8/06* (2013.01); *H04W 8/183* (2013.01); *H04W 24/10* (2013.01); *H04W 28/0215* (2013.01); *H04W 28/08* (2013.01); *H04W 36/0055* (2013.01); *H04W 36/0069* (2018.08); *H04W 48/06* (2013.01); *H04W 48/08* (2013.01); *H04W 48/12* (2013.01); *H04W 48/18* (2013.01); *H04W 52/346* (2013.01); *H04W 56/001* (2013.01); *H04W 56/002* (2013.01); *H04W 60/00* (2013.01); *H04W 60/02* (2013.01); *H04W 72/048* (2013.01); *H04W 72/0453* (2013.01); *H04W 72/0486* (2013.01); *H04W 72/085* (2013.01); *H04W 74/004* (2013.01); *H04W 74/0833* (2013.01); *H04W 76/10* (2018.02); *H04W 76/14* (2018.02); *H04W 76/15* (2018.02); *H04W 76/18* (2018.02); *H04W 76/19* (2018.02); *H04B 7/0413* (2013.01); *H04L 5/001* (2013.01); *H04L 5/0098* (2013.01); *H04W 8/04* (2013.01); *H04W 84/12* (2013.01); *H04W 88/02* (2013.01); *H04W 88/08* (2013.01); *H04W 88/16* (2013.01); *H04W 88/18* (2013.01); *H04W 92/20* (2013.01); *Y02D 70/126* (2018.01)

(56) References Cited

U.S. PATENT DOCUMENTS

| | | | |
|---|---|---|---|
| 9,144,091 B2* | 9/2015 | Yamada | H04W 72/044 |
| 9,648,514 B2* | 5/2017 | Blankenship | H04L 69/322 |
| 10,015,805 B2 | 7/2018 | Zhang et al. | |
| 2010/0208654 A1* | 8/2010 | Sampath | H04L 47/24 370/328 |
| 2012/0327821 A1 | 12/2012 | Lin et al. | |
| 2014/0219248 A1* | 8/2014 | Reddiboyana | H04W 76/15 370/331 |
| 2014/0335869 A1* | 11/2014 | Choi | H04W 40/36 455/438 |
| 2015/0244429 A1* | 8/2015 | Zhang | H04B 7/024 370/329 |
| 2015/0312957 A1* | 10/2015 | Pelletier | H04W 76/15 370/329 |
| 2016/0234847 A1 | 8/2016 | Zhang et al. | |
| 2016/0295614 A1* | 10/2016 | Lee | H04W 74/0833 |
| 2018/0317237 A1 | 11/2018 | Zhang et al. | |

FOREIGN PATENT DOCUMENTS

| WO | WO-2013104413 A1 | 7/2013 |
|---|---|---|
| WO | WO-2015066281 A1 | 5/2015 |

OTHER PUBLICATIONS

"U.S. Appl. No. 14/917,154, Final Office Action dated Oct. 25, 2017", 9 pgs.
"U.S. Appl. No. 14/917,154, Non Final Office Action dated Jun. 29, 2017", 7 pgs.
"U.S. Appl. No. 14/917,154, Notice of Allowance dated Mar. 1, 2018", 6 pgs.
"U.S. Appl. No. 14/917,154, Preliminary Amendment filed Mar. 7, 2016", 3 pgs.
"U.S. Appl. No. 14/917,154, Response filed Jan. 25, 2018 to Final Office Action dated Oct. 25, 2017", 8 pgs.
"U.S. Appl. No. 14/917,154, Response filed Sep. 29, 2017 to Non Final Office Action dated Jun. 29, 2017", 10 pgs.
"U.S. Appl. No. 15/994,154, Notice of Allowance dated Aug. 14, 2019", 9 pgs.
"U.S. Appl. No. 15/994,154, Preliminary Amendment filed Jul. 18, 2018", 8 pgs.
"Comparison of the UP Alternatives", R2-132338, 3GPP TSG-RAN WG2 Meeting #83, Barcelona, Spain, NSN, Nokia Corporation, NTT DOCOMO, Inc., Samsung, (Aug. 2013), 5 pgs.
"Data split options and considerations on U-plane protocol architecture for dual-connectivity", R2-131054, 3GPP TSG-RAN WG2 Meeting #81bis, Chicago, USA NOKIA Siemens Networks, (Apr. 2013), 9 pgs.
"European Application Serial No. 14859145.6, Extended European Search Report dated Mar. 22, 2017", 8 pgs.
"European Application Serial No. 14859145.6, Response Filed Oct. 17, 2017 to Extended European Search Report dated Mar. 22, 2017", 11 pgs.
"European Application Serial No. 18188652.4, Extended European Search Report dated Sep. 7, 2018", 10 pgs.
"European Application Serial No. 18188652.4, Response filed Jun. 26, 2019 to Extended European Search Report dated Sep. 7, 2018", 16 pgs.

(56) References Cited

OTHER PUBLICATIONS

"Impacts of Splitting a Single EPS Bearer between Two (or more) eNBs", R2-131401, 3GPP TSG RAN WG2 Meeting #81bis. Chicago, USA, Intel Corporation, (Apr. 2013), 9 pgs.

"International Application Serial No. PCT/US2014/063080, International Preliminary Report on Patentability dated May 12, 2016", 7 pgs.

"International Application Serial No. PCT/US2014/063080, International Search Report dated Feb. 12, 2015", 4 pgs.

"International Application Serial No. PCT/US2014/063080, Written Opinion dated Feb. 12, 2015", 5 pgs.

"Uplink scheduling and BSRs with dual connectivity", R2-133412, 3GPP TSG-RAN WG2 Meeting #83bis, Ljubljana, Slovenia, Ericsson, (Oct. 2013), 3 pgs.

Huawei, et al., "DRB configuration and switch in dual Connectivity", 3GPP Draft; R2-142062, 3rd Generation Partnership Project (3GPP), Mobile Competence Centre ; 650, Route Des Lucioles ; F-06921 Sophia-Antipolis Cedex ; France, vol. RAN WG2, No. Seoul, South Korea; May 19-May 23, 2014, [Online] retrieved from the internet: <http://www.3gpp.org/ftp/tsg_ran/WG2_RL2/TSGR2_86/Docs/>, (May 10, 2014), 5 pgs.

Rapportuer, "Introduction of Dual Connectivity (RAN3 topics)", 3GPP Draft; R3-141480-DC-STAGE2-01, 3rd Generation Partnership Project (3GPP), Mobile Competence Centre ; 650, Route Des Lucioles ; F-06921 Sophia-Antipolis Cedex ; France, vol. RAN WG3, No. Seoul, South Korea; May 19-May 23, 2014, [Online] retrieved from the internet: <:http://www.3gpp.org/ftp/tsg_ran/WG3_lu/TSGR3_84/Docs/>, (May 24, 2014), 62 pgs.

\* cited by examiner

USER EQUIPMENT AND METHODS OF BEARER OPERATION FOR CARRIER AGGREGATION

PRIORITY CLAIM

This application is a continuation of U.S. patent application Ser. No. 15/994,154, filed May 31, 2018, which is a continuation of U.S. patent application Ser. No. 14/917,154, filed Mar. 7, 2016, which is a U.S. National Stage Filing under 35 U.S.C. 371 from International Application No. PCT/US2014/063080, tiled Oct. 30, 2014 and published in English as WO 2015/066281 on May 7, 2015, which claims the benefit of priority to U.S. Provisional Patent Application Ser. No. 61/898,425, filed Oct. 31, 2013, each of which is incorporated herein by reference in its entirety.

TECHNICAL FIELD

Embodiments pertain to wireless communications. Some embodiments relate to wireless networks including LTE networks. Some embodiments relate to Carrier Aggregation (CA) of multiple frequency bands. Some embodiments relate to CA arrangements using multiple Evolved Node-Bs (eNBs). Some embodiments relate to communication through split bearers.

BACKGROUND

Mobile networks may increase available bandwidth, throughput or capacity using techniques such as carrier aggregation (CA), in which multiple frequency bands may be supported simultaneously. As an example, a mobile device may communicate on multiple frequency bands with a single base station. As another example, the mobile device may communicate to multiple base stations on different frequency bands. Some associated tasks, such as security and allocation of communication bearers, may be challenging for CA arrangements, especially those in which multiple base stations are used. Accordingly, there is a general need for methods that enable CA operation, and particularly CA operation with multiple base stations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
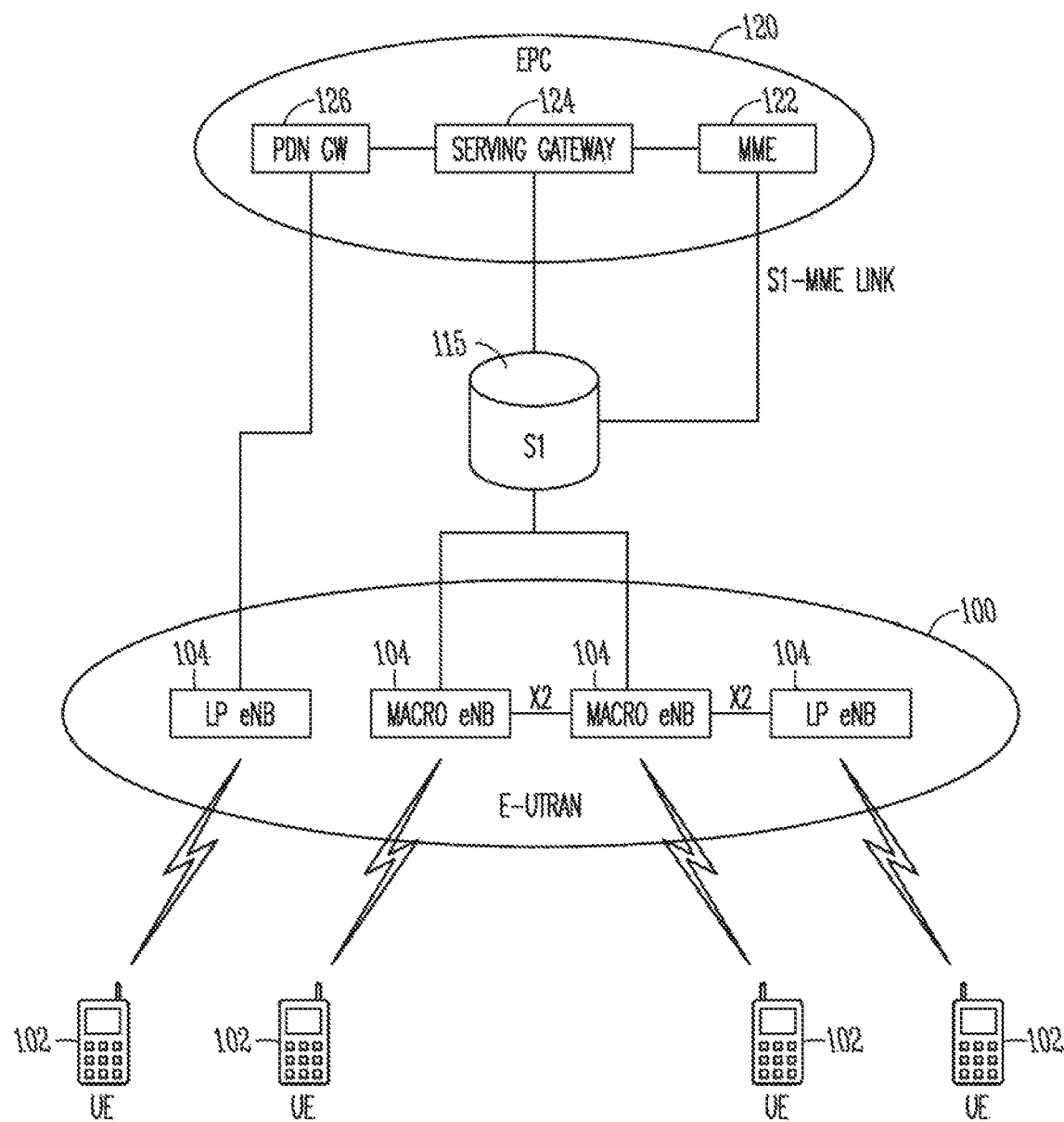
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with some embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

In accordance with some embodiments, a UE 102 may receive downlink traffic packets from one or more eNBs 104 as part of a split data radio bearer (DRB). The UE 102 may also receive an uplink eNB indicator for an uplink eNB 104 to which the UE is to transmit uplink traffic packets as part of the split DRB and may transmit uplink traffic packets to the uplink eNB 104 as part of the split DRB. The uplink eNB 104 may be the same as or different from the eNB 104 from which the downlink traffic packets are received. These embodiments are described in more detail below.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. In addition, eNBs 104 may exchange signals or communicate over an interface such as an X2 interface. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain and represents the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 2:
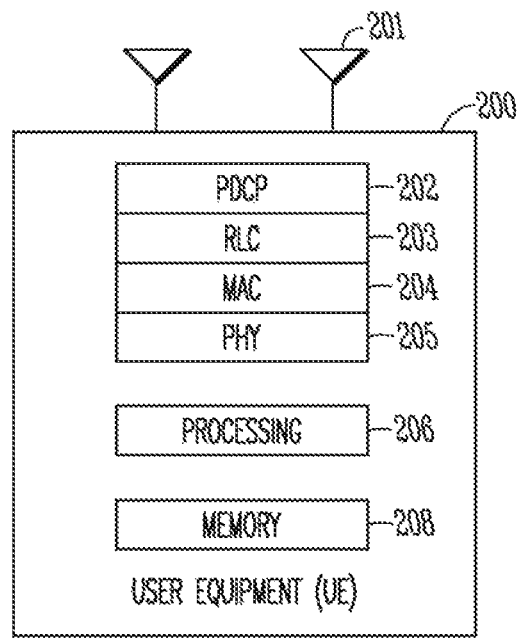
FIG. 2 is a block diagram of a User Equipment (UE) in accordance with some embodiments.

FIG. 2 is a block diagram of a User Equipment (UE) in accordance with some embodiments. The UE 200 may be a UE 102 as depicted in FIG. 1. The UE 200 may include Packet Data Convergence Protocol (PDCP) layer circuitry 202 for services such as security (ciphering and deciphering), header compression and decompression, and other services that may be performed as part of operation with 3GPP or other standards. The UE 200 may include Radio Link Control (RLC) layer circuitry 203 for services such as concatenation, segmentation, reassembly and other services that may be performed as part of operation with 3GPP or other standards. The UE 200 may include Medium Access Control layer (MAC) circuitry 204 for controlling access to the wireless medium. The UE 200 may include physical layer (PHY) circuitry 205 for transmitting and receiving signals to and from the eNB 300, other eNBs, other UEs or other devices using one or more antennas 201. The UE 200 may also include processing circuitry 206 and memory 208 arranged to perform the operations described herein. In some embodiments, one or more of the above layers 202-205 shown as part of the UE 200 may be associated with operation of a primary cell and/or a secondary cell as part of Carrier Aggregation (CA), which will be described in more detail below.

Figure 3:
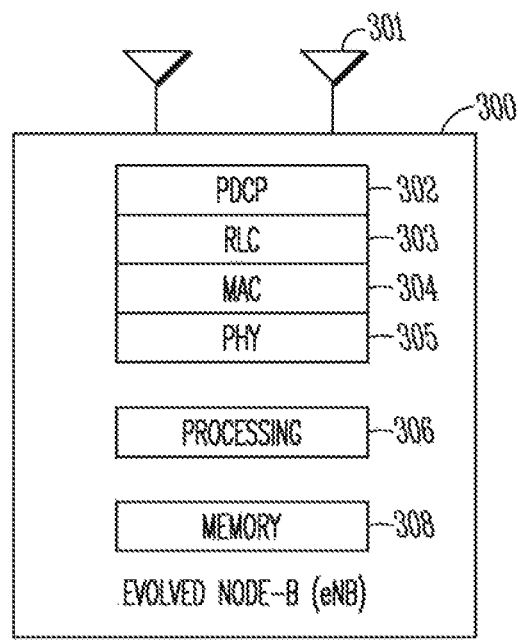
FIG. 3 is a block diagram of an Evolved Node-B (eNB) in accordance with some embodiments.

FIG. 3 is a block diagram of an Evolved Node-B (eNB) in accordance with some embodiments. The eNB 300 may be an eNB 104 as depicted in FIG. 1. The eNB 300 may include PDCP layer circuitry 302 for services such as security (ciphering and deciphering), header compression and decompression, and other services that may be performed as part of operation with 3GPP or other standards. The eNB 300 may include RLC layer circuitry 303 for services such as concatenation, segmentation, reassembly and other services that may be performed as part of operation with 3GPP or other standards. The eNB 300 may include MAC layer circuitry 304 for controlling access to the wireless medium. The eNB 300 may include physical layer (PHY) circuitry 305 for transmitting and receiving signals to and from the UE 200, other UEs, other eNBs or other devices using one or more antennas 301. The eNB 300 may also include processing circuitry 306 and memory 308 arranged to perform the operations described herein. In some embodiments, one or more of the above layers 302-305 shown as part of the eNB 300 may be associated with operation of a primary cell and/or a secondary cell as part of Carrier Aggregation (CA), which will be described in more detail below.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be the UE 200 or the eNB 300 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200 and eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RANT), magnetic disk storage media, optical storage media, flash-memory devices, and other storage devices and media. Some embodiments may include one or more processors and may be configured with instructions stored on a computer-readable storage device.

In accordance with embodiments, the UE 102 may support dual-connectivity with a Master eNB (MeNB) 104 and a Secondary eNB (SeNB) 104. The UE 102 may receive downlink traffic packets from the SeNB 104 as part of a split data radio bearer (DRB). In addition, the UE 102 may also receive downlink traffic packets from the MeNB 104 as part of the split DRB. At least a portion of control functionality for the split DRB may be performed at each of the MeNB 104 and the SeNB 104. The UE 102 may receive an uplink eNB indicator for an uplink eNB 104 to which the UE 102 is to transmit uplink traffic packets as part of the split DRB. Based at least partly on the uplink eNB indicator, the UE 102 may transmit uplink traffic packets to the uplink eNB 104 as part of the split DRB. The uplink eNB 104 may be selected from a group of candidate eNBs that includes the MeNB 104 and the SeNB 104. These embodiments are described in more detail below.

In some scenarios, the performance, throughput or capacity for a system may be improved or increased through the use of Carrier Aggregation (CA), in which multiple frequency bands may be utilized by eNBs 104 and UEs 102 to exchange control information and traffic packets. As an example, the control information may include mobility information or security input while the traffic packets may include data, voice or other content. One of the frequency bands may be associated with a Primary Cell (PCell), which may be used to exchange control information. In some embodiments, the PCell may also be used to transmit traffic packets. An eNB 104 that supports the PCell may be referred to as a "Master eNB" or "MeNB." in addition, one or more Secondary Cells (SCells) may be configured on other frequency bands to operate cooperatively with the PCell for exchanging traffic packets. The PCell and the SCell may operate according to 3GPP standards in some embodiments.

It should be noted that throughout this disclosure, an MeNB and/or SeNB may be referred to as an eNB 104 as depicted in FIG. 1 for illustrative purposes. This is not limiting, however, and it is understood that an eNB 104 may be configured as an MeNB, an SeNB or either in some cases. In addition, reference to the MeNB and SeNB by the same number 104 is not limiting.

In some embodiments, one or more of the SCells may be assigned to an eNB 104 different from the MeNB. Accordingly, an eNB 104 that supports one or more SCells for the UE 102, but does not support the PCell for the UE 102, may be referred to as a "Secondary eNB" or "SeNB." Such CA arrangements in which the LIE 102 is served by one or more SeNBs 104 (in addition to the MeNB 104) may be referred to as "dual connectivity." In addition, such CA arrangements may also be referred to as "inter-eNB CA" or "inter-node resource aggregation." These embodiments will be described in more detail below. It should be noted that embodiments described herein are not limited in terms of the number of Scells configured or the number of SeNBs 104 used in a CA scenario or CA example. Although discussion below may describe CA scenarios that include an MeNB 104 and a single SeNB 104 supporting a single SCell, this is done for ease of illustration only, and is not limiting.

Figure 4:
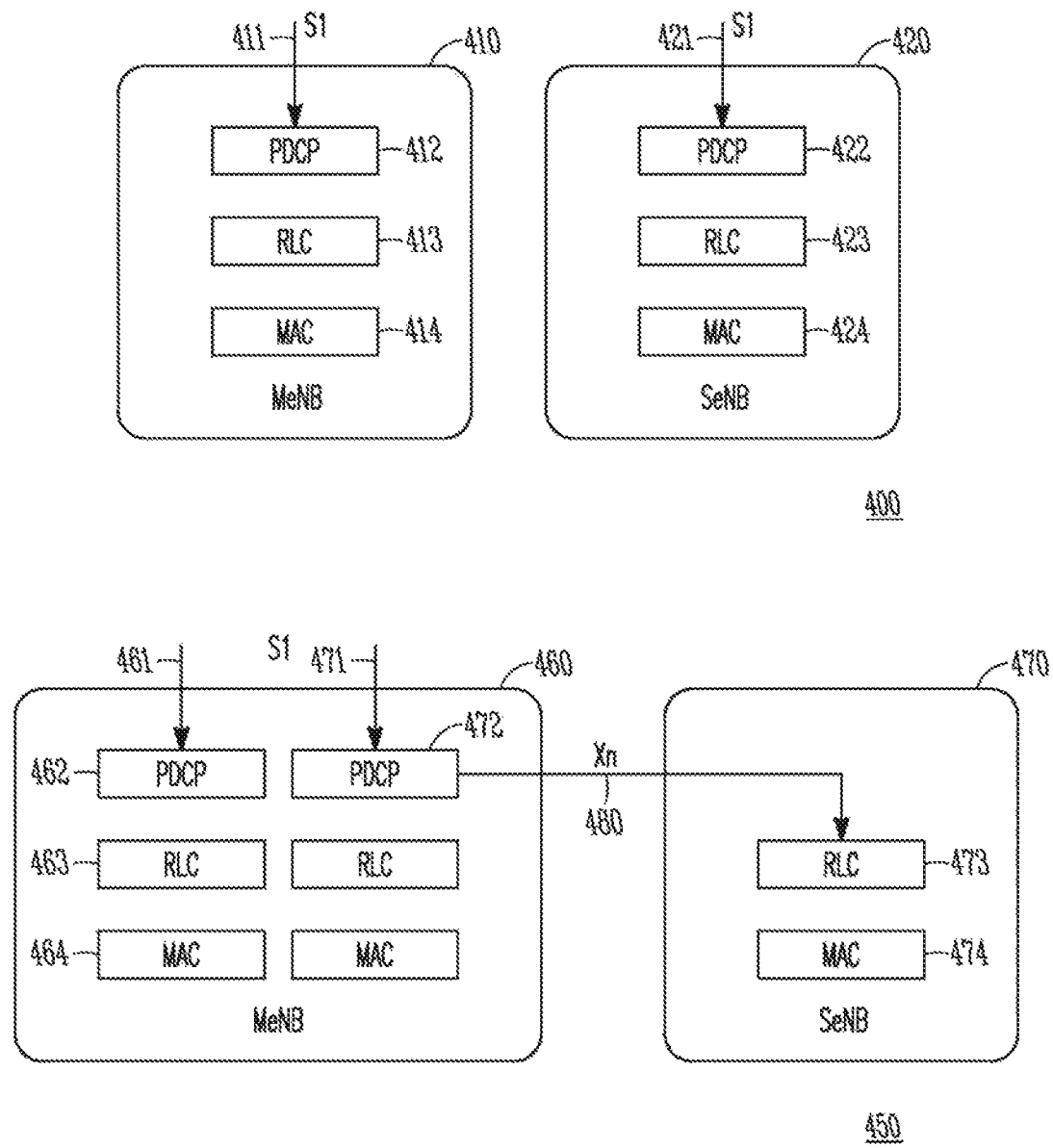
FIG. 4 illustrates example user plane architectures for dual connectivity Carrier Aggregation (CA)

FIG. 4 illustrates example user plane architectures for dual connectivity Carrier Aggregation (CA). In the examples shown, one or more S1-U interfaces previously described may connect a Serving GW 124 to eNBs 104, which may include an MeNB 410 and an SeNB 420. The MeNB 410 and SeNB 420 both may exchange traffic packets with the UE 102 as part of the CA operation. In the "non-bearer split" arrangement 400, the S1-U interface 411 may connect the Serving GW 124 and the MeNB 410 as part of a bearer for a PCell. Accordingly, the MeNB 410 may perform functionality for layers such as PDCP 412, RLC 413, and MAC 414 for the bearer for the PCell. In addition, the S1-U interface 421 may connect the Serving GW 124 and the SeNB 420 as part of a bearer for an SCell. The SeNB 420 may perform functionality for layers such as PDCP 422, RLC 423, and MAC 424 for the bearer for the SCell. In non-bearer split arrangements such as 400, the SeNB 420 may perform security tasks such as distribution and/or management of security keys.

In the "bearer split" arrangement 450, the S1-U interface 461 may connect the Serving GW 124 and the MeNB 460 as part of a bearer for a PCell, and the MeNB 460 may perform functionality for layers such as PDCP 462, RLC 463, and MAC 464 for the bearer for the PCell. In addition, an SCell may be supported on the SeNB 470 through a bearer that is split between the MeNB 460 and the SeNB 470. Accordingly, the S1-U interface 471 may connect the Serving GW 124 and the MeNB 420 and the MeNB 420 may perform functions related to the PDCP layer 472 as part of the bearer for the SCell. The SeNB 470 may perform functions related to the RLC layer 473 and MAC layer 474 as part of the bearer for the SCell. The Xn interface 480 may be used for exchanging data or packets between the MeNB 460 and SeNB 470 as part of the bearer split arrangement. In bearer split arrangements such as 450, as the MeNB 460 may perform functions for the PDCP layer 472, the SeNB 470 may not need to handle security tasks such as distribution and/or management of security keys.

Various challenges may arise in arrangements such as 400 or 450 or others that support CA with multiple eNBs 104. Some examples of challenges and techniques for addressing the challenges will be addressed below.

In a first challenge, the HE 102 supporting CA may be configured with a first bearer in a bearer split arrangement (such as 450) with an MeNB 104 and a first SeNB 104. As previously described, the MeNB 104 may handle security aspects for the first bearer, and therefore a security key associated with the UE 102 may not be made available to the first SeNB 104. As part of the CA, the UE 102 may be configured with an additional second hearer in a non-bearer split arrangement such as 400 with the MeNB 104 and a second. SeNB 104. As previously described for non-bearer split arrangements, the second SeNB 104 may handle or may need to handle security aspects for the second bearer. However, the security key for the UE 102 may not be available to SeNBs 104 operating as part of the CA for various reasons. Accordingly, the SeNB 104 may not have the flexibility to support a non-bearer split arrangement, and may be restricted to a bearer split arrangement for the new bearer.

A method for addressing the first challenge is described below. For an SeNB 104 that already supports one or more radio bearers, when a new radio bearer is established in the SeNB 104, the MeNB 104 may transmit a security key or security information to the SeNB 104. Accordingly, the non-bearer split option for the new bearer may be used, and the SeNB 104 may be able to provide necessary security functions for the new hearer by utilizing the security key or security information. That is, the SeNB 104 may be provided with flexibility to handle bearer split or non-bearer split configurations. The MeNB 104 may use an XnAP message or other message to transmit security keys or other security information to the SeNB 104 as part of the method. In some embodiments, a message that is also used to establish the radio bearer may be used. As an example, a security key such as a KeNB may be transmitted for use at the SeNB 104 for providing security functions for the new bearer. The security key transmitted to the SeNB 104 may be the same as a key used by the MeNB 104 for security functions at the MeNB 104, for instance as part of a PCell. However, the security key transmitted to the SeNB 104 is not so limited, and may be different from security keys used at the MeNB 104 in some cases.

In a second challenge, an SeNB 104 may support multiple SCells, either for the UE 102 or for the UE 102 and other UEs. For a non-bearer split configuration such as 400, a security key may be available to the SeNB 104 and may be used by the SeNB 104 for providing security functions such as in the PDCP layer 422 in the appropriate SCell. A key refresh procedure may be performed when a counter (such as a "PDCP COUNT" or similar in 3GPP or other standards) is about to wrap-around, reset or expire. However, when the SeNB 104 supports additional SCells, a key refresh procedure may be challenging. In addition, determination of a time at which such a key refresh procedure may take place or conditions or events to trigger such a key refresh procedure may be challenging.

A method for addressing the second challenge is described below. For an SeNB 104 that supports multiple SCells, a key refresh procedure may take place for all SCells supported by the SeNB 104 when at least one of the PDCP COUNT counters is about to wrap-around, reset or expire. In some embodiments, when a PDCP COUNT counter of at least one of the SCells is within a predetermined margin of a wrap-around count value, a key refresh procedure may be implemented for all the SCells. The MeNB 104 may initiate the procedure by sending one or more messages to the SeNB 104, in some embodiments. The procedure may also be performed automatically by the SeNB 104 in some embodiments.

In a third challenge, downlink reception at the UE 102 may include reception of traffic packets on a split bearer from multiple eNBs 104 (an MeNB 104 and one or more SeNBs 104). As an example, the UE 102 may support a bearer in a bearer split configuration between the MeNB 104 and an SeNB 104. Accordingly, the UE 102 may perform RLC functionality (for instance, block 203 from FIG. 2) for downlink reception of traffic packets independently for the MeNB 104 and the SeNB 104. That is, the UE 102 may pass a received packet from the RLC layer 203 to the PDCP layer 202 regardless of the eNB 104 (MeNB 104 or SeNB 104) from which the packet is received. Accordingly, packets arriving at the PDCP layer 202 from the RLC layer 203 may be out of sequence. When the PDCP layer 202 detects that a packet has arrived out of sequence, it may start a PDCP reordering timer, such as a "pdcp-t-Reordering" timer of 3GPP or other standards. Upon expiration of the PDCP reordering timer, or in response to the expiration, the PCDP layer 202 may pass the out-of-sequence packets to an upper layer. As a result of the bearer split configuration, if one of the eNBs 104 (MeNB or SeNB) does not transmit data for reception at the UE 102, the PDCP reordering process may cause unnecessary delay. For instance, the PDCP layer 202 may essentially be waiting for packets with a certain sequence number or index to comply with reordering, although such packets may not have even been transmitted to the UE 102.

A method for addressing the third challenge is described below. For a UE 102 that supports a bearer in a bearer split configuration between the MeNB 104 and the SeNB 104, a PDCP reordering timer at the UE 102 may take the value of zero. That is, the PDCP reordering timer may be disabled or bypassed in some embodiments. Accordingly, when bearer data is transmitted from only one of the MeNB 104 and SeNB 104 during a time period, PDCP reordering may be unnecessary and may introduce additional delay in passing the received packets from the PDCP layer 202 to upper layers. Setting the value of the PDCP reordering timer to zero, or bypassing or disabling the PDCP reordering timer, may enable processed PDCP data to be delivered to upper layers without the additional delay from the PDCP reordering. As such, setting the value of the PDCP reordering timer to zero, or bypassing or disabling the PDCP reordering timer, may be an optimization or an improvement. In some embodiments, one of the eNBs 104 may enable or disable PDCP reordering, or may set PDCP reordering timer value(s) to zero, for multiple bearers individually in a flexible arrangement.

In a fourth challenge, the UE 102 may support a CA arrangement that includes operation with a bearer according to a split bearer configuration with an MeNB 104 and an SeNB 104. Accordingly, the operation may include transmission of uplink packets by the UE 102 and reception of downlink packets at the UE 102 as part of the bearer. If transmission of the uplink traffic packets by the UE 102 is restricted to the SeNB 104, the lack of flexibility regarding the uplink transmission may present challenges for the UE 102 and/or the network. As an example scenario, the SeNB 104 may transmit downlink traffic packets to the UE 102 as part of the bearer, but it may be better for the UE 102 to transmit uplink traffic packets for the bearer to the MeNB 104 instead of the SeNB 104. In some cases, the SeNB 104 may have limited uplink spectrum despite having sufficient downlink spectrum.

A method for addressing the fourth challenge is described below. When the network configures a bearer split configuration for a bearer between the UE 102 and the MeNB 104 and the SeNB 104, the network may also configure to which eNB 104 (of the MeNB or SeNB) the UE 102 is to transmit uplink traffic packets as part of the bearer. Accordingly, a bearer setup message may be received at the UE 102. The bearer setup message may be transmitted by the MeNB 104 in some embodiments. It should be noted that the bearer setup message may or may not be a message specifically intended for the establishment of the bearer, but is not so limited. In some embodiments, the bearer setup message may refer to another control message intended for other purposes, and control information related to the establishment of the bearer may be transported by the control message. In any case, the bearer setup message may include an uplink eNB indicator related to which eNB 104 the UE 102 is to transmit uplink traffic packets.

In some embodiments, the eNB 104 to which the UE 102 is to transmit uplink traffic packets may be selected from a group of eNBs 104 that includes the MeNB 104 and the SeNB 104. That is, the uplink eNB indicator may indicate which of the MeNB 104 or SeNB 104 that the UE 102 is to transmit uplink traffic packets. As an example, the uplink eNB indicator may be a binary indicator with the two options of MeNB 104 or SeNB 104. Such embodiments are not limiting, however, as the uplink eNB indicator may include any indicator(s) or parameter(s) that may convey information to the UE 102 about an eNB 104 to which the UE 102 is to transmit uplink traffic packets as part of the bearer.

In addition, as part of the method, the UE 102 may transmit one or more RLC Status PDUs to the eNB 104 to which the network has instructed the UE 102 to transmit uplink traffic packets as part of the bearer. As an example, the RLC Status PDUs may be transmitted to one of the MeNB 104 or SeNB 104.

Figure 5:
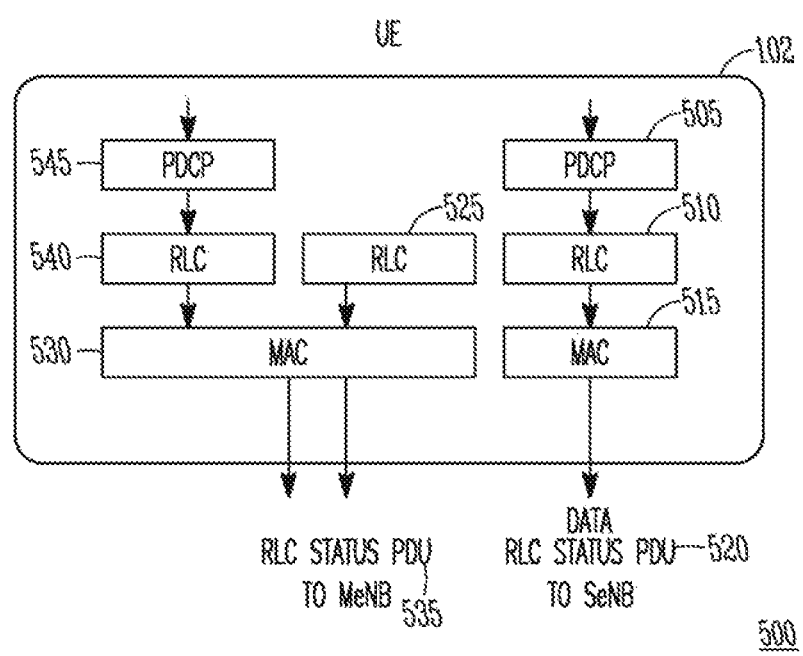
FIG. 5 illustrates another example user plane architecture for dual connectivity Carrier Aggregation (CA)

FIG. 5 illustrates another example user plane architecture for dual connectivity Carrier Aggregation (CA). Continuing with the previous example related to the fourth challenge above, at the UE 102, a split bearer may include functionality performed by the PDCP 505, RLC 510, and MAC 515 when the UE 102 is configured to transmit uplink traffic packets to the SeNB 104. As an alternative, when the UE 102 is configured to transmit uplink traffic packets to the MeNB 104, functionality may be performed by the PDCP 505, RLC 525, and MAC 530. It should be recalled that the UE 102 may also support a bearer related to the PCell which includes exchanging packets between the UE 102 and the MeNB 104. Such functionality for the PCell bearer may be performed by the MAC 530, RLC 540, and PDCP 545.

Figure 6:
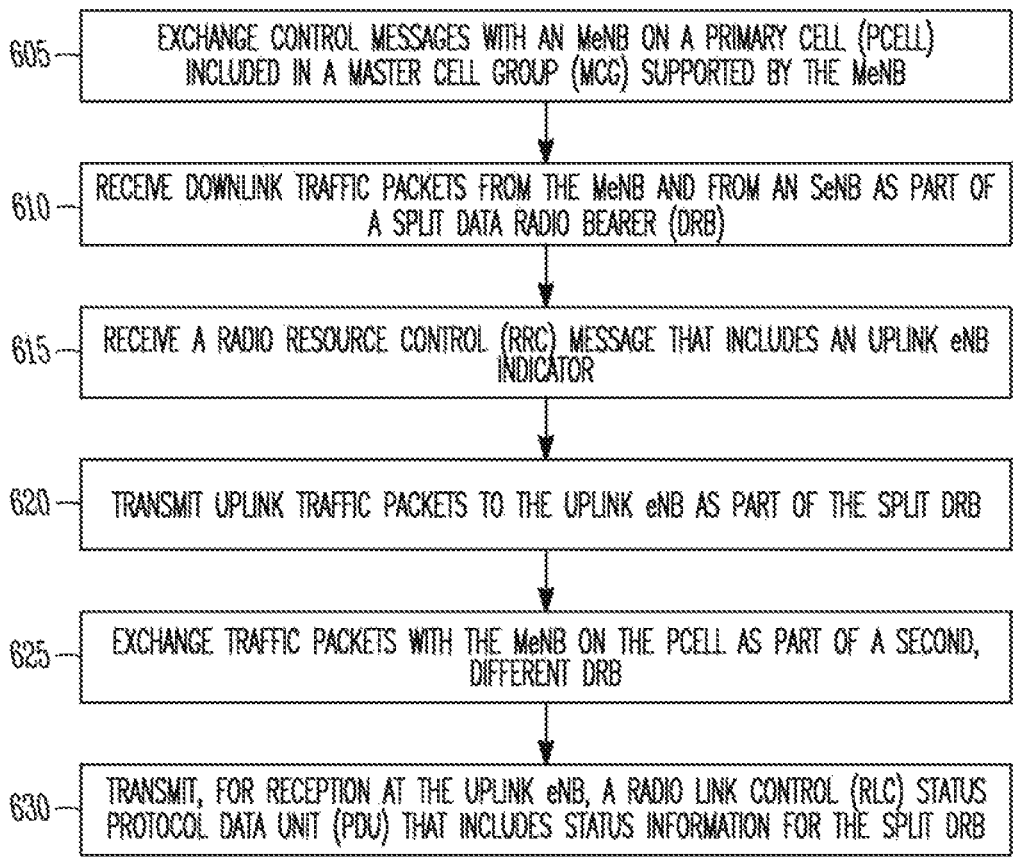
FIG. 6 illustrates the operation of a method of supporting dual-connectivity with a Master Evolved Node-B (MeNB) and a Secondary eNB (SeNB) in accordance with some embodiments.

FIG. 6 illustrates the operation of a method of supporting dual-connectivity with a Master Evolved Node-B (MeNB) 104 and a Secondary eNB (SeNB) 104 in accordance with some embodiments. It is important to note that embodiments of the method 600 may include additional or even fewer operations or processes in comparison to what is illustrated in FIG. 6. In addition, embodiments of the method 600 are not necessarily limited to the chronological order that is shown in FIG. 6. In describing the method 600, reference may be made to FIGS. 1-5 and 7-8, although it is understood that the method 600 may be practiced with any other suitable systems, interfaces and components.

In addition, while the method 600 and other methods described herein may refer to eNBs 104 or UEs 102 operating in accordance with 3GPP or other standards, embodiments of those methods are not limited to just those eNBs 104 or UEs 102 and may also be practiced on other mobile devices, such as a Wi-Fi access point (AP) or user station (STA). Moreover, the method 600 and other methods described herein may be practiced by wireless devices configured to operate in other suitable types of wireless communication systems, including systems configured to operate according to various IEEE standards such as IEEE 802.11.

At operation 605 of the method 600, the UE 102 may exchange control messages with an MeNB 104 on a Primary Cell (PCell) included in a Master Cell Group (MCG) supported by the MeNB 104. The control messages may be related to establishment of communication sessions, radio bearers or other control tasks.

At operation 610, the UE 102 may receive downlink traffic packets from the MeNB and from an SeNB 104 as part of a split data radio bearer (DRB). Accordingly, at least a portion of control functionality for the split DRB may be performed at each of the MeNB 104 and the SeNB 104. At operation 615, the UE 102 may receive a Radio Resource Control (RRC) message that includes an uplink eNB indicator for an uplink eNB 104 to which the UE 102 is to transmit uplink traffic packets as part of the split DRB. At operation 620, uplink traffic packets may be transmitted to the uplink eNB 104 as part of the split DRB. At operation 625, the UE 102 may transmit, for reception at the uplink eNB 104, a Radio Link Control (RLC) status Protocol Data Unit (PDU) that includes status information for the split DRB.

In some embodiments, the uplink eNB 104 may be selected from a group of candidate eNBs 104 that includes the MeNB 104 and the SeNB 104. In some embodiments, the uplink eNB 104 may be different from the SeNB 104. As previously described, it may be beneficial or necessary in some cases that the uplink traffic and downlink traffic for the DRB be sent to different eNBs 104, and that discussion may apply to the method 600. In some embodiments, the eNB 104 to which the uplink traffic packets are transmitted may be based at least partly on the uplink eNB indicator. In some embodiments, the uplink traffic packets may include one or more Packet Data Convergence Protocol (PDCP) Service Data Units (SDUs), although not limited as such.

In some embodiments, the split DRB may operate as part of a Secondary Cell (SCell) included in a Secondary Cell Group (SCG) supported by the SeNB 104 and the uplink eNB indicator may indicate whether the UE 102 is to transmit uplink traffic packets on the SCG or the MCG. Accordingly, the eNB indicator in these embodiments may perform the same functionality as the eNB indicator described earlier that may indicate which of the MeNB 104 or SeNB 104 to which the uplink traffic packets should be transmitted.

Figure 7:
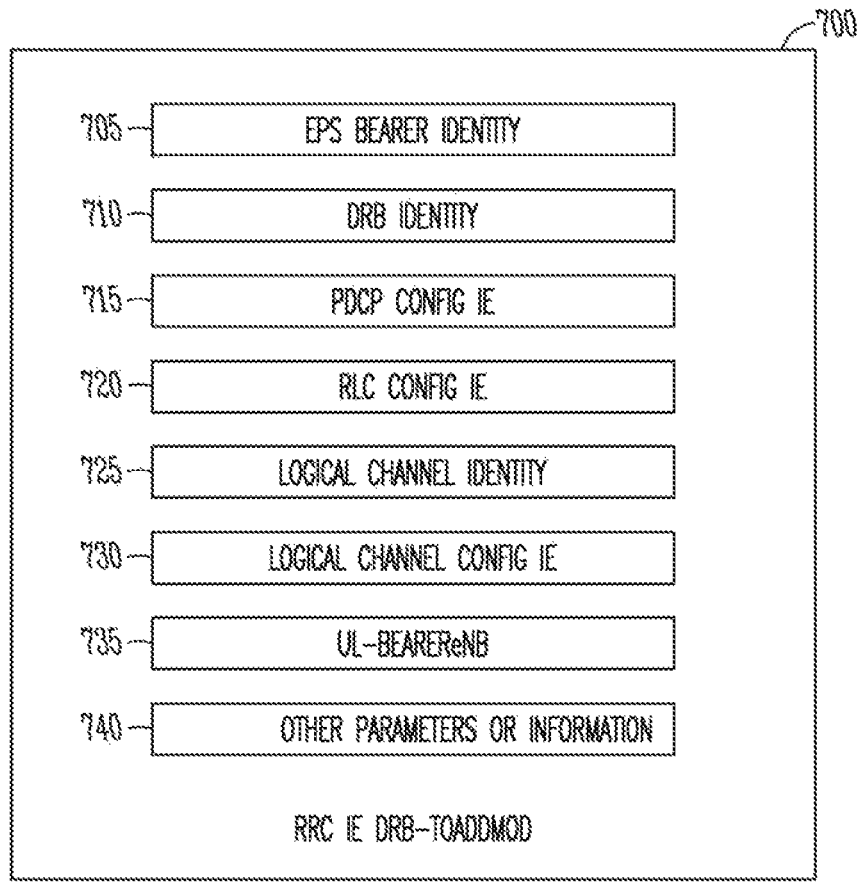
FIG. 7 illustrates a Radio Resource Control Information Element (RRC IE) DRB-ToAddMod in accordance with some embodiments.

FIG. 7 illustrates a Radio Resource Control Information Element (RRC IE) DRB-ToAddMod in accordance with some embodiments. In some embodiments, the RRC message that includes the uplink eNB indicator may be or may include an information element such as the RRC IE DRB-ToAddMod 700. However, it is understood that the RRC IE DRB-ToAddMod 700 is shown and described for illustrative purposes, and is not limiting. Accordingly, the RRC message may be of a different form that may or may not include some or all of the information included in the RRC IE DRB-ToAddMod 700. In addition, the organization of the RRC message is not limited to that shown in FIG. 7, as some or all of the information or parameters shown may be combined or divided but still included in the RRC message.

Information or parameters of the RRC IE DRB-ToAddMod 700 may include, but are not limited to, the EPS bearer identity 705, the DRB identity 710, the PDCP Config IE 715, the RLC Config IE 720, the Logical Channel Identity 725, the Logical Channel Config IE 730, and the UL-BearerEnb parameter 735. In addition, the RRC IE DRB-ToAddMod 700 may or may not include other parameters or information 740.

In this example, the UL-BearerEnb parameter 735 may indicate the eNB 104 to which the UE 102 is to transmit uplink packets. Accordingly, the UL-BearerEnb parameter 735 may be or may serve the same functionality as the uplink eNB indicator previously described. As an example, the UL-BearerEnb parameter 735 may take on the values of "MeNB" or "SeNB" to indicate the eNB 104 to which the UE 102 is to transmit uplink packets.

At operation 630, the UE 102 may exchange traffic packets with the MeNB 104 on the PCell as part of a second, different DRB. Accordingly, as part of the CA arrangement, the UE 102 may support both DRBs simultaneously, and may even support more DRBs in some cases.

It should be pointed out that the method 600 may be used to address the fourth challenge previously described, although not limited as such. Accordingly, some or all of the discussion related to either the previous method for addressing the fourth challenge or to the method 600 may apply to the other method in some cases. In addition, some embodiments may include techniques or operations from either or both of these methods or other methods disclosed herein.

Figure 8:
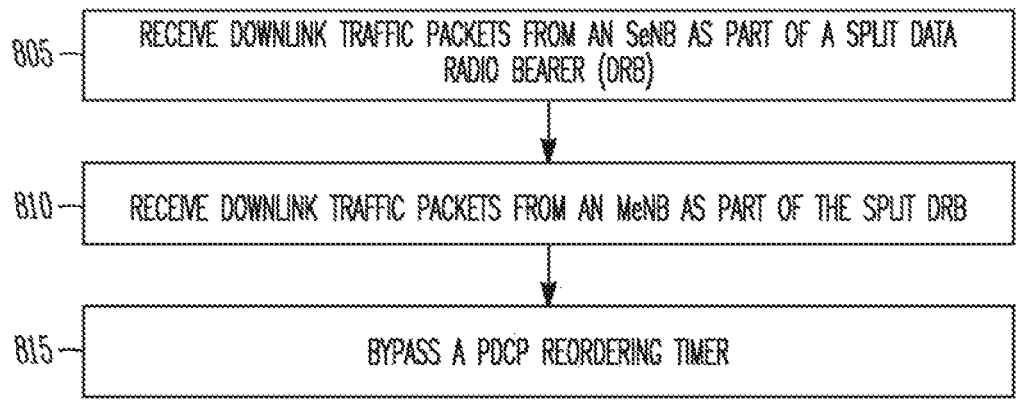
FIG. 8 illustrates the operation of another method of supporting dual-connectivity with an MeNB and an SeNB in accordance with some embodiments.

FIG. 8 illustrates the operation of another method of supporting dual-connectivity with an MeNB and an SeNB in accordance with some embodiments. In some embodiments, the method 800 may be practiced at the UE 102, but is not limited as such. As mentioned previously regarding the method 600, embodiments of the method 800 may include additional or even fewer operations or processes in comparison to what is illustrated in FIG. 8 and embodiments of the method 800 are not necessarily limited to the chronological order that is shown in FIG. 8. In describing the method 800, reference may be made to FIGS. 1-7, although it is understood that the method 800 may be practiced with any other suitable systems, interfaces and components. In addition, embodiments of the method 800 may refer to eNBs 104, UEs 102, APs, STAs or other wireless or mobile devices.

At operation 805 of the method 800, the UE 102 may receive downlink traffic packets from the SeNB 104 as part of a split data radio bearer (DRB). As previously described, at least a portion of control functionality for the split DRB may be performed at each of the MeNB 104 and the SeNB 104. At operation 810, the UE 102 may receive downlink traffic packets from the MeNB 104 as part of the split DRB. Accordingly, the UE 102 may support the split DRB as part of a CA arrangement. In order to pass the downlink traffic packets to layers above the PDCP layer, a PDCP layer reordering may be used. At operation 815, the UE 102 may bypass a PDCP reordering timer as part of the PDCP layer reordering for the received downlink traffic packets. In some embodiments, the PDCP reordering timer may control a minimum waiting period for which the UE 102 monitors for downlink traffic packets received out of sequence. In some embodiments, the PDCP reordering timer may be set to a value of zero as part of the bypass.

It should be pointed out that the method 800 may be used to address the third challenge previously described, although not limited as such. Accordingly, some or all of the discussion related to either the previous method for addressing the third challenge or to the method 800 may apply to the other method in some cases. In addition, some embodiments may include techniques or operations from either or both of these methods or other methods disclosed herein.

User Equipment (UE) to support dual-connectivity with a Master Evolved Node-B (MeNB) and a Secondary eNB (SeNB) is disclosed herein. The UE may comprise hardware processing circuitry configured to receive downlink traffic packets from the MeNB and from the SeNB as part of a split data radio bearer (DRB). In some embodiments, at least a portion of control functionality for the split DRB may be performed at each of the MeNB and the SeNB. The hardware processing circuitry may be further configured to receive a Radio Resource Control (RRC) message that includes an uplink eNB indicator for an uplink eNB to which the UE is to transmit uplink traffic packets as part of the split DRB. The hardware processing circuitry may be further configured to transmit, based at least partly on the uplink eNB indicator, uplink traffic packets to the uplink eNB as part of the split DRB. In some embodiments, the uplink eNB may be selected from a group of candidate eNBs that includes the MeNB and the SeNB. In some embodiments, the uplink eNB may be different from the SeNB.

The hardware processing circuitry may be further configured to exchange control messages with the MeNB on a Primary Cell (PCell) included in a Master Cell Group (MCG) supported by the MeNB. In some embodiments, the split DRB may operate as part of a Secondary Cell (SCell) included in a Secondary Cell Group (SCG) supported by the SeNB. In some embodiments, the uplink eNB indicator may indicate whether the UE is to transmit uplink traffic packets on the SCG or the MCG. In some embodiments, the uplink traffic packets may include one or more Packet Data Convergence Protocol (PDCP) Service Data Units (SDUs). The hardware processing circuitry may be further configured to exchange traffic packets with the MeNB on the PCell as part of a second, different DRB. The hardware processing circuitry may be further configured to transmit, for reception at the uplink eNB, a Radio Link Control (RLC) status Protocol Data Unit (PDU) that includes status information for the split DRB.

A non-transitory computer-readable storage medium that stores instructions for execution by one or more processors to perform operations for support, by User Equipment (UE), of dual-connectivity with a Master Evolved Node-B (MeNB) and a Secondary eNB (SeNB) is also disclosed herein. The operations may configure the one or more processors to receive downlink traffic packets from the MeNB and from the SeNB as part of a split data radio bearer (DRB). In some embodiments, at least a portion of control functionality for the split DRB may be performed at each of the MeNB and the SeNB. The operations may configure the one or more processors to receive a Radio Resource Control (RRC) message that includes an uplink eNB indicator for an uplink eNB to which the HE is to transmit uplink traffic packets as part of the split DRB. The operations may configure the one or more processors to transmit, based at least partly on the uplink eNB indicator, uplink traffic packets to the uplink eNB as part of the split DRB. In some embodiments, the uplink eNB may be selected from a group of candidate eNBs that includes the MeNB and the SeNB.

The operations may further configure the one or more processors to exchange control messages with the MeNB on a Primary Cell (PCell) included in a Master Cell Group (MCG) supported by the MeNB. In some embodiments, the split DRB may operate as part of a Secondary Cell (SCell) included in a Secondary Cell Group (SCG) supported by the SeNB. In some embodiments, the uplink eNB indicator may indicate whether the UE is to transmit uplink traffic packets on the SCG or the MCG. In some embodiments, the uplink traffic packets may include one or more Packet Data Convergence Protocol (PDCP) Service Data Units (SDUs).

A method of supporting dual-connectivity with a Master Evolved Node-B (MeNB) and a Secondary eNB (SeNB) at User Equipment (UE) is also disclosed herein. The method may include receiving downlink traffic packets from the MeNB and from the SeNB as part of a split data radio bearer (DRB). In some embodiments, at least a portion of control functionality for the split DRB may be performed at each of the MeNB and the SeNB. The method may further include receiving a Radio Resource Control (RRC) message that includes an uplink eNB indicator for an uplink eNB to which the UE is to transmit uplink traffic packets as part of the split DRB. The method may further include transmitting, based at least partly on the uplink eNB indicator, uplink traffic packets to the uplink eNB as part of the split DRB. In some embodiments, the uplink eNB may be selected from a group of candidate eNBs that includes the MeNB and the SeNB.

The method may further include exchanging control messages with the MeNB on a Primary Cell (PCell) included in a Master Cell Group (MCG) supported by the MeNB. In some embodiments, the split DRB may operate as part of a Secondary Cell (SCell) included in a Secondary Cell Group (SCG) supported by the SeNB. In some embodiments, the uplink eNB indicator may indicate whether the UE is to transmit uplink traffic packets on the SCG or the MCG. In some embodiments, the uplink traffic packets may include one or more Packet Data Convergence Protocol (PDCP) Service Data Units (SDUs).

User Equipment (UE) to support dual-connectivity with a Master Evolved Node-B (MeNB) and a Secondary eNB (SeNB) is also disclosed herein. The UE may comprise hardware processing circuitry configured to receive downlink traffic packets from the MeNB and from the SeNB as part of a split data radio bearer (DRB). In some embodiments, at least a portion of control functionality for the split DRB may be performed at each of the MeNB and the SeNB. The hardware processing circuitry may be further configured to receive downlink traffic packets from the MeNB as part of a second, different DRB. The hardware processing circuitry may be further configured to bypass, as part of PDCP layer reordering for the received downlink traffic packets, a PDCP reordering timer that controls a minimum waiting period for which the UE monitors for downlink traffic packets received out of sequence. In some embodiments, the PDCP reordering timer may be set to a value of zero as part of the bypass.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for dual connectivity with a Master Cell Group (MCG) and a Secondary Cell Group (SCG), the apparatus comprising:
    processing circuitry configured to:
        decode downlink traffic packets received from the MCG and from the SCG as part of a split data radio bearer (DRB);
        decode a Radio Resource Control (RRC) signaling received from the MCG, the RRC signalling including a first indicator specifying whether the UE is to transmit uplink traffic packets on the SCG, and a second indicator specifying a Packet Data Convergence Protocol (PDCP) timer for reordering downlink traffic packets received out of sequence as part of the split DRB; and
        based at least partly on the first indicator, encode the uplink traffic packets for transmission to a next generation Node-B (gNB) in the MCG or a gNB in the SCG as part of the split DRB; and
    memory coupled to the processing circuitry, the memory configured to store the first and second indicators.

2. The apparatus of claim/wherein the processing circuitry is further configured to:
    encode the uplink traffic packets for transmission to the gNB in the MCG when the first indicator indicates packet data units may not be communicated via the SCG.

3. The apparatus of claim 1, wherein the processing circuitry is further configured to:
    encode the uplink traffic packets for transmission to the gNB in the SCG when the first indicator indicates packet data units may be communicated via the SCG.

4. The apparatus of claim 1, wherein the processing circuitry is configured to:
    bypass reordering of the downlink traffic packets received out of sequence based on the second indicator.

5. The apparatus of claim 4, wherein the second indicator is set to a value of zero as part of the bypass.

6. The apparatus of claim 1, wherein the uplink traffic packets include one or more PDCP Service Data Units (SDUs).

7. The apparatus of claim/wherein the processing circuitry is further configured to:
    exchange traffic packets with the gNB in the MCG on a primary cell (PCell) as part of a second, different DRB.

8. The apparatus of claim 1, wherein the processing circuitry is further configured to:

encode for transmission to the gNB in the MCG or the gNB in the SCG, a Radio Link Control (RLC) status Protocol Data Unit (PDU) that includes status information for the split DRB.

9. The apparatus of claim 1, wherein the processing circuitry is further configured to:
exchange control messages with the gNB in the MCG on a Primary Cell (PCell) included in the MCG.

10. A non-transitory computer readable storage device including instructions stored thereon, which when executed by one or more processors of a User Equipment (UE), cause the UE to perform operations to:
decode downlink traffic packets received from a Master Cell Group (MCG) and from a Secondary Cell Group (SCG) as part of a split data radio bearer (DRB);
decode a Radio Resource Control (RRC) signaling received from the MCG, the RRC signalling including a first indicator specifying whether the UE is to transmit uplink traffic packets on the SCG, and a second indicator specifying a Packet Data Convergence Protocol (PDCP) timer for reordering downlink traffic packets received out of sequence as part of the split DRB; and
based at least partly on the first indicator, encode the uplink traffic packets for transmission to a next generation Node-B (gNB) in the MCG or a gNB in the SCG as part of the split DRB.

11. The non-transitory computer readable storage device of claim 10, wherein the split DRB operates as part of a Secondary Cell (SCell) included in the SCG and a Primary Cell (PCell) included in the MCG.

12. The non-transitory computer readable storage device of claim 11, wherein the instructions further cause the UE to:
encode the uplink traffic packets for transmission to the gNB in the MCG when the first indicator indicates packet data units may not be communicated via the SCG.

13. The non-transitory computer readable storage device of claim 11, wherein the instructions further cause the UE to:
encode the uplink traffic packets for transmission to the gNB in the SCG when the first indicator indicates packet data units may be communicated via the SCG.

14. The non-transitory computer readable storage device of claim 10, wherein the instructions further cause the UE to:
bypass reordering of the downlink traffic packets received out of sequence based on the second indicator.

15. The non-transitory computer readable storage device of claim 14, wherein the second indicator is set to a value of zero as part of the bypass.

16. The non-transitory computer readable storage device of claim 10, wherein the uplink traffic packets include one or more PDCP Service Data Units (SDUs).

17. The non-transitory computer readable storage device of claim 10, wherein the instructions further cause the UE to:
exchange traffic packets with the gNB in the MCG on a primary cell (PCell) as part of a second, different DRB.

18. The non-transitory computer readable storage device of claim 10, wherein the instructions further cause the UE to:
transmit a Radio Link Control (RLC) status Protocol Data Unit (PDU) that includes status information for the split DRB.

19. A non-transitory computer readable storage device including instructions stored thereon, which when executed by one or more processors of a next generation Node-B (gNB) in a Master Cell Group (MCG), cause the gNB to perform operations to:
encode downlink traffic packets for transmission to a user equipment (UE) as part of a split data radio bearer (DRB), the split DRB associated with the MCG and with a Secondary Cell Group (SCG); and
encode a Radio Resource Control (RRC) signaling for transmission to the UE, the RRC signalling including a first indicator specifying whether the UE is to transmit uplink traffic packets on the SCG, and a second indicator specifying a Packet Data Convergence Protocol (PDCP) timer for reordering downlink traffic packets received out of sequence as part of the split DRB.

20. The non-transitory computer readable storage device of claim 19, wherein the instructions further cause the gNB to:
exchange traffic packets with the UE in the MCG on a primary cell (PCell) as part of a second, different DRB.

* * * * *